(12) United States Patent
Chen et al.

(10) Patent No.: US 12,332,945 B2
(45) Date of Patent: Jun. 17, 2025

(54) MERGING SUPPLEMENTAL INFORMATION WITH THE CONTENT OF SOURCE MATERIAL

(71) Applicant: International Business Machines Corporation, Armonk, NY (US)

(72) Inventors: Dong Chen, Beijing (CN); Ming Lei Zhang, Beijing (CN); Yuan Jie Zhang, Ningbo (CN); Yin Xi Guo, Beijing (CN); Ting Ting Zhan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 93 days.

(21) Appl. No.: 18/238,987

(22) Filed: Aug. 28, 2023

(65) Prior Publication Data

US 2025/0077588 A1 Mar. 6, 2025

(51) Int. Cl.
| | | |
|---|---|---|
| *G06F 16/00* | (2019.01) | |
| *G06F 16/215* | (2019.01) | |
| *G06F 16/23* | (2019.01) | |
| *G06F 16/93* | (2019.01) | |
| *G06F 40/174* | (2020.01) | |
| *G06F 40/279* | (2020.01) | |

(52) U.S. Cl.
CPC ............ *G06F 16/93* (2019.01); *G06F 16/215* (2019.01); *G06F 16/2365* (2019.01); *G06F 40/174* (2020.01); *G06F 40/279* (2020.01)

(58) Field of Classification Search
CPC .... G06F 16/93; G06F 16/213; G06F 16/2365; G06F 40/279; G06F 40/174
See application file for complete search history.

(56) References Cited

U.S. PATENT DOCUMENTS

| | | | |
|---|---|---|---|
| 8,010,894 B2 * | 8/2011 | Merrill | G06F 40/197 |
| | | | 715/255 |
| 10,339,208 B2 * | 7/2019 | Vanderport | G06F 40/134 |
| 11,074,400 B2 | 7/2021 | Tian et al. | |
| 11,620,441 B1 * | 4/2023 | Schafer | G06F 40/169 |
| | | | 715/271 |
| 2012/0016832 A1 * | 1/2012 | Berard | G06F 40/258 |
| | | | 706/47 |
| 2014/0250058 A1 * | 9/2014 | Thiruvidan | G06F 16/93 |
| | | | 707/608 |

(Continued)

FOREIGN PATENT DOCUMENTS

| | | |
|---|---|---|
| CN | 101042702 A | 9/2007 |
| CN | 102801770 A | 11/2012 |

(Continued)

*Primary Examiner* — Jean M Corrielus
(74) *Attorney, Agent, or Firm* — Zilka-Kotab, P.C.

(57) ABSTRACT

A computer-implemented method, according to one embodiment, includes: receiving copies of notes that were originally recorded by participants, the notes corresponding to a source document. Note fragments in the received copies of notes are identified and one or more machine learning models are used to compare the identified note fragments to pages and paragraphs in the source document that the respective note fragments are located in. Based at least in part on the comparison, the identified note fragments are merged with a copy of the source document to form a pseudo-source document. Furthermore, the pseudo-source document is output.

20 Claims, 8 Drawing Sheets

(56) References Cited

U.S. PATENT DOCUMENTS

| | | | |
|---|---|---|---|
| 2015/0278169 A1* | 10/2015 | Vanderport | G06F 3/04847 |
| | | | 715/208 |
| 2016/0320945 A1* | 11/2016 | Brunn | G06F 40/194 |
| 2018/0121392 A1 | 5/2018 | Zhang et al. | |
| 2019/0158550 A1 | 5/2019 | Wilde et al. | |
| 2020/0233879 A1* | 7/2020 | Papanicolaou | G06F 16/93 |
| 2020/0293607 A1 | 9/2020 | Nelson et al. | |
| 2021/0004582 A1* | 1/2021 | Evans | G06F 16/9014 |
| 2022/0100964 A1* | 3/2022 | Talwadker | G06F 16/355 |
| 2023/0229800 A1* | 7/2023 | Casper | G06F 40/197 |
| | | | 726/26 |

FOREIGN PATENT DOCUMENTS

| | | |
|---|---|---|
| CN | 104580763 A | 4/2015 |
| CN | 110045847 A | 7/2019 |
| WO | 2013017036 A1 | 2/2013 |

\* cited by examiner

MERGING SUPPLEMENTAL INFORMATION WITH THE CONTENT OF SOURCE MATERIAL

BACKGROUND

The present invention relates to distributed communication systems, and more specifically, this invention relates to automatically evaluating and merging supplemental information with the content of electronic source material.

Electronic source material (also referred to herein as "documents" and "digital files") have a number of benefits compared to physical documents. For instance, electronic documents are easier to store and access in comparison to physical documents. The process of accessing a physical document involves manually searching each document in a collection until the desired document is found, while multiple electronic documents can be automatically compared against one or more keywords. Moreover, electronic documents can be uploaded from and/or downloaded to any device connected to a network, while tangible documents (e.g., papers) must be physically transported between locations. Similarly, electronic documents take up much less space than their physical counterparts. As a result, an increasing amount of physical material has been digitized.

While electronic documents are easier to store and access, the process of modifying an electronic document has been impacted. This is particularly true in group settings where multiple individuals are evaluating the content of a same electronic document. For instance, web conferencing is an umbrella term which includes various types of online audio and/or video collaborative services, including webinars, video calls, group calls using voice over Internet protocol, etc. While individuals using such web services may each store a local copy of the original electronic document to modify, the original document itself may only be edited by one user at a time. Limiting access to an electronic document in this way avoids data corruption, but it has also caused a bottleneck.

SUMMARY

A computer-implemented method, according to one embodiment, includes: receiving copies of notes that were originally recorded by participants, the notes corresponding to a source document. Note fragments in the received copies of notes are identified and one or more machine learning models are used to compare the identified note fragments to pages and paragraphs in the source document that the respective note fragments are located in. Based at least in part on the comparison, the identified note fragments are merged with a copy of the source document to form a pseudo-source document. Furthermore, the pseudo-source document is output.

A computer program product, according to another embodiment, includes a computer readable storage medium having program instructions embodied therewith. The program instructions are readable by a processor, executable by the processor, or readable and executable by the processor, to cause the processor to: perform the foregoing method.

A system, according to another embodiment, includes: a processor, and logic that is integrated with the processor, executable by the processor, or integrated with and executable by the processor. Moreover, the logic is configured to: perform the foregoing method.

Other aspects and implementations of the present invention will become apparent from the following detailed description, which, when taken in conjunction with the drawings, illustrate by way of example the principles of the invention.

DETAILED DESCRIPTION

Figure 1:
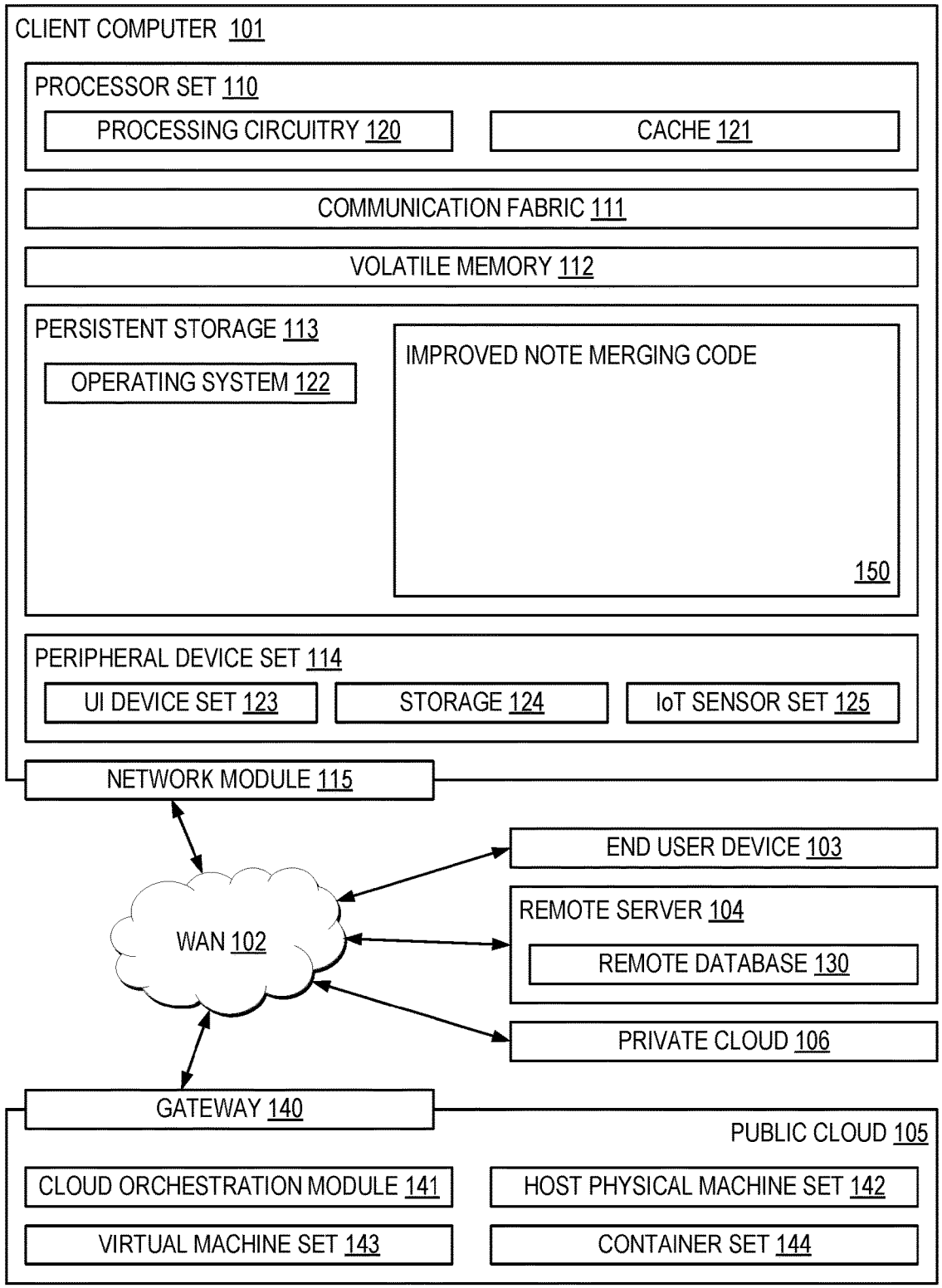
FIG. 1 is a diagram of a computing environment, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for automatically evaluating and merging supplemental information with the content of a source document. Implementations herein are able to achieve this improved process of combining supplemental information by performing note fragment interception on information received from different participants of a group setting. Moreover, trained machine learning models may be used to evaluate the note fragments and merge them to create a combined pseudo-source document, e.g., as will be described in further detail below.

In one general approach, a computer-implemented method includes: receiving copies of notes that were originally recorded by participants, the notes corresponding to a source document. Note fragments in the received copies of notes are identified and one or more machine learning models are used to compare the identified note fragments to pages and paragraphs in the source document that the respective note fragments are located in. Based at least in part on the comparison, the identified note fragments are merged with a copy of the source document to form a pseudo-source document. Furthermore, the pseudo-source document is output.

In another general approach, a computer program product includes: a computer readable storage medium having program instructions embodied therewith. The program instructions are readable by a processor, executable by the processor, or readable and executable by the processor, to cause the processor to: perform the foregoing method.

In yet another general embodiment, a system includes: a processor, and logic that is integrated with the processor, executable by the processor, or integrated with and executable by the processor. Moreover, the logic is configured to: perform the foregoing method.

Various aspects of the present disclosure are described by narrative text, flowcharts, block diagrams of computer systems and/or block diagrams of the machine logic included in computer program product (CPP) approaches. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product approaches ("CPP approach" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as improved note merging code at block 150 for automatically evaluating and merging supplemental information received from different individuals with the content of a source document. The improvement is achieved at least in part as a result of using each SNAT port to facilitate multiple connections to a same destination IP address and DNS port. This desirably reduces processing backlog as well as the number of received requests that fail.

In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some approaches, storage 124 may take the form of a quantum computing storage device for storing data in the form of qubits. In approaches where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some approaches, network control functions and network forwarding functions of network module 115 are performed on the same physical hardware device. In other approaches (for example, approaches that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some approaches, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some approaches, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other approaches a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

In some aspects, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various implementations.

As noted above, electronic documents (or digital files) have a number of benefits compared to physical documents. For instance, electronic documents are easier to store and access in comparison to physical documents. The process of accessing a physical document involves manually searching each document in a collection until the desired document is found, while multiple electronic documents can be automatically compared against one or more keywords. Moreover, electronic documents can be uploaded from and/or downloaded to any device connected to a network, while tangible documents (e.g., papers) must be physically transported between locations. Similarly, electronic documents take up much less space than their physical counterparts. As a result, an increasing amount of physical material has been digitized.

While electronic documents are easier to store and access, the process of modifying an electronic document has been impacted. This is particularly true in group settings where multiple individuals are evaluating the content of a same electronic document. While these individuals may each store a local copy of the original electronic document to modify, the original document itself may only be edited by one user at a time. Limiting access to an electronic document in this way avoids data corruption, but it has also caused a significant performance bottleneck in conventional products.

Additionally, some individuals use handwritten annotations to record notes or other information that supplements a shared electronic document. In one example, a group member may write on the whiteboard during an in-person meeting to discuss an electronic document. In another example, group members may handwrite personal notes in physical notebooks and/or software-based note taking programs on personal computers. This leads to a situation where notes of the different group members are distributed on different physical objects, including paper notebooks, electronic note documents, etc. Each of these different physical objects are also separated from the original document itself.

Again, while conventional products have suffered from processing situations like this, implementations herein are able to automatically merge supplemental information with the content of a source document. This is achieved by performing note fragment interception on information received from different participants. Moreover, trained machine learning models may be used to evaluate the note fragments and merge them to create a combined pseudo-source document, e.g., as will be described in further detail below.

Figure 2A:
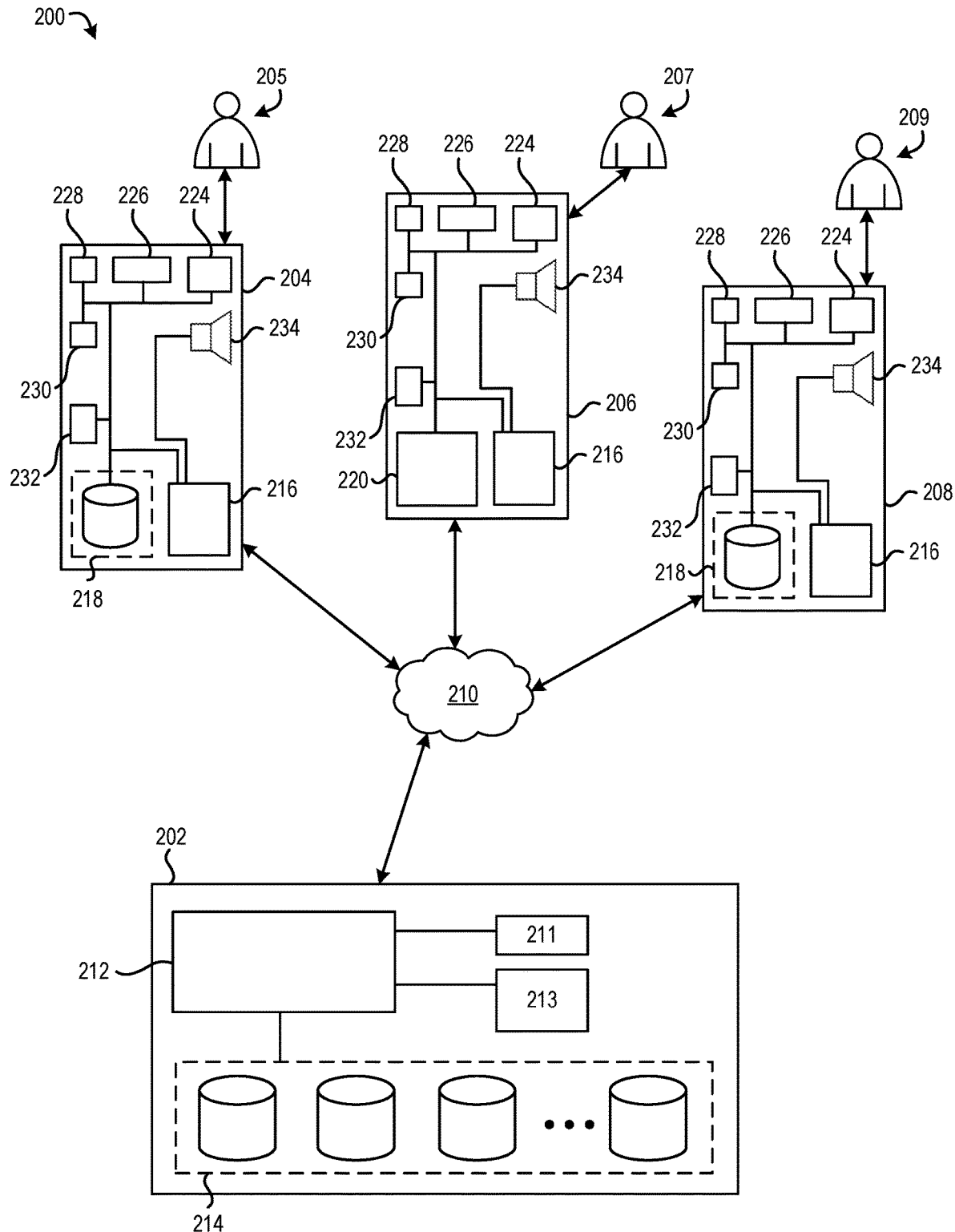
FIG. 2A is a representational view of a distributed system, in accordance with one approach.

Looking now to FIG. 2A, a system 200 having a distributed architecture is illustrated in accordance with one approach. As an option, the present system 200 may be implemented in conjunction with features from any other approach listed herein, such as those described with reference to the other FIGS., such as FIG. 1. However, such system 200 and others presented herein may be used in various applications and/or in permutations which may or may not be specifically described in the illustrative approaches or implementations listed herein. Further, the system 200 presented herein may be used in any desired environment. Thus FIG. 2A (and the other FIGS.) may be deemed to include any possible permutation.

As shown, the system 200 includes a central server 202 that is connected to electronic devices 204, 206, 208 accessible to the respective participants 205, 207, 209. Each of these electronic devices 204, 206, 208 and respective participants 205, 207, 209 may be separated from each other such that they are positioned in different geographical locations. For instance, the central server 202 and electronic devices 204, 206, 208 are connected to a network 210.

The network 210 may be of any type, e.g., depending on the desired approach. For instance, in some approaches the network 210 is a WAN, e.g., such as the Internet. However, an illustrative list of other network types which network 210 may implement includes, but is not limited to, a LAN, a PSTN, a SAN, an internal telephone network, etc. As a result, any desired information, data, commands, instructions, responses, requests, etc. may be sent between participants 205, 207, 209 using the electronic devices 204, 206, 208 and/or central server 202, regardless of the amount of separation which exists therebetween, e.g., despite being positioned at different geographical locations.

However, it should also be noted that two or more of the electronic devices 204, 206, 208 and/or central server 202 may be connected differently depending on the approach. According to an example, which is in no way intended to limit the invention, two edge compute nodes may be located relatively close to each other and connected by a wired connection, e.g., a cable, a fiber-optic link, a wire, etc., or any other type of connection which would be apparent to one skilled in the art after reading the present description.

While each of the electronic devices 204, 206, 208 and central server 202 are shown as being connected to a same network 210, it should be noted that information may be sent between the locations differently depending on the implementation. According to an example, which is in no way intended to limit the invention, a shared (e.g., open) communication channel corresponding to a group video chat may be formed between each of the electronic devices 204, 206, 208. This shared communication channel may be formed by the processor 212 and a channel management module in response to a scheduled meeting, receiving an impromptu request from a participant, a predetermined condition being met, etc. The shared communication channel thereby allows the participants 205, 207, 209 to exchange information (e.g., notes, audio signals, video images, typed messages, etc.) freely between each other.

As noted above, while participants on a group call may locally record notes (e.g., supplemental information) which pertain to a shared electronic document, the notes are also preferably implemented in the shared electronic document itself. For example, a group member may write on the whiteboard during an in-person meeting to discuss an electronic document. In another example, group members may handwrite personal notes in notebooks or a software-based note taking program on a personal computer. This leads to a situation where notes are distributed on different physical objects, including paper notebooks, electronic note documents, etc., each of which are separated from the original document.

Accordingly, processor 212 may be configured to compare copies of the shared original document received from each of the participants 205, 207, 209 and identify the differences between them. These differences may be identified by performing note fragment interception on the information received from the different participants. Moreover, trained machine learning models may be used to evaluate the identified note fragments and merge them to create a combined pseudo-source document, e.g., as will be described in further detail below.

Figure 2B:
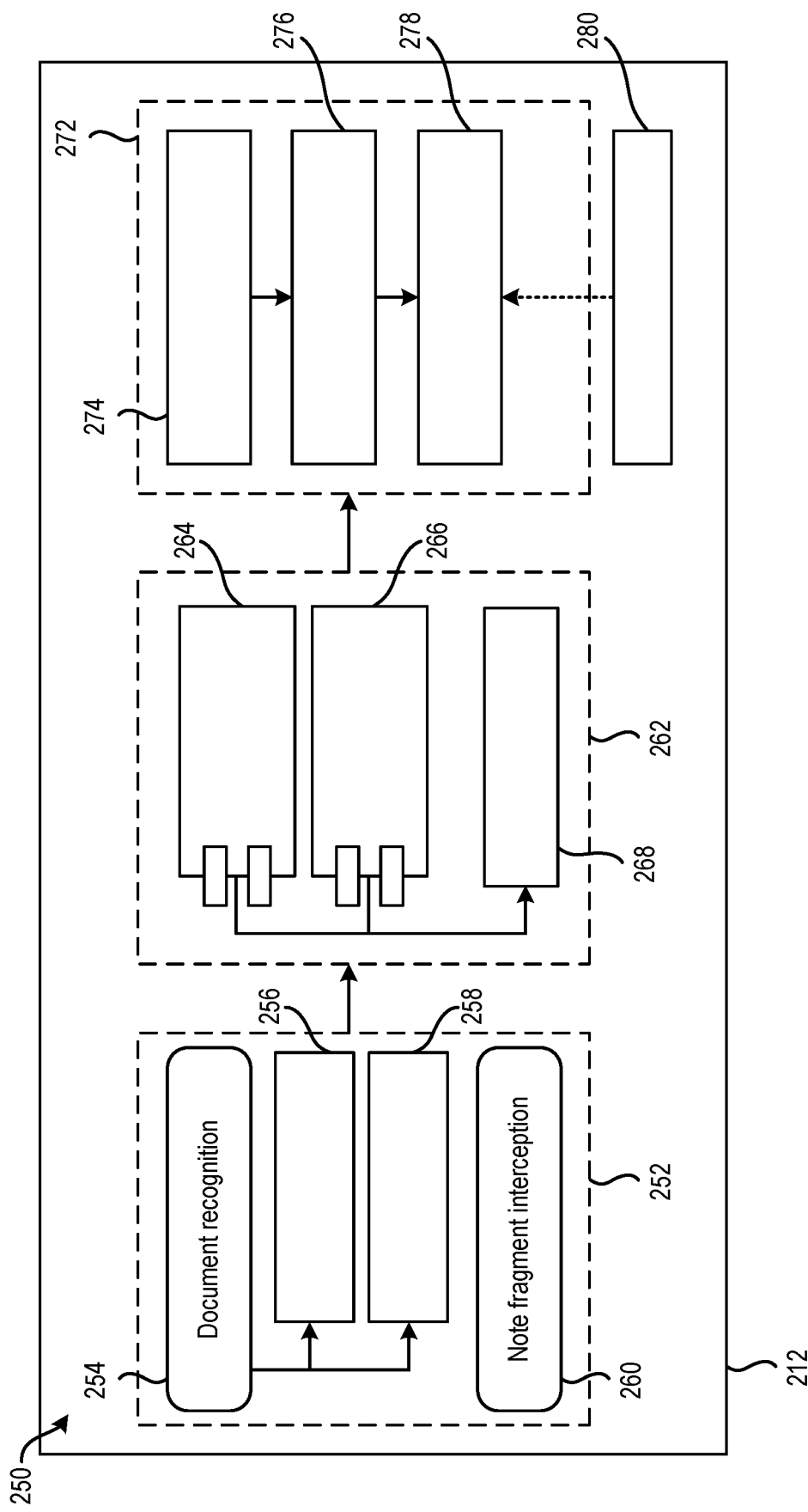
FIG. 2B is a partial detailed representational view of the processor in FIG. 2A, in accordance with one approach.

Referring momentarily now to FIG. 2B, an illustrative view of the process flow 250 for processor 212 at central server 202 of FIG. 2A is illustrated in accordance with one approach. As an option, the present process flow 250 may be implemented in conjunction with features from any other approach listed herein, such as those described with reference to the other FIGS. However, the process flow 250 and others presented herein may be used in various applications and/or in permutations which may or may not be specifically described in the illustrative approaches or implementations listed herein.

As shown, the process flow 250 includes a content extraction phase 252 which includes performing document recognition 254. Document recognition 254 is further shown as including note content extraction 256 as well as source document extraction 258. Note content in a copy of a document may be identified by comparing the document copy to the original (e.g., source) document and identifying differences therebetween. Accordingly, operation 260 includes performing note fragment interception on information received from different participants to determine differences from a source document. In still other approaches, one or more machine learning models may be used to evaluate the content of a received document.

Proceeding to an analysis phase 262, the note fragments identified during the content extraction phase 252 are compared against the content of the source document. Specifically, component 264 compares each of the note fragments to the page of the source document in which the respective note fragment is located. For instance, component 264 may read each note fragment, confirm the information included on each page that a note fragment is found, and determine which note fragments correspond to the information on the page.

Component 266 further compares each of the note fragments to the paragraph of the source document in which the respective note fragment is located. For instance, component 266 may read each note fragment, also read information included on each page that a note fragment is found, and match the paragraphs to the read information. It follows that components 264 and 266 may be able to determine the relevant pages and paragraphs in the source document through precise and fuzzy matching of the note fragments. Again, this allows implementations herein to determine the association relationship between each of the note fragments and the source document as compared to a page and paragraph address of each note fragment.

Components 264, 266 may perform the comparisons based on exact matches and/or fuzzy matches identified between the various note fragments and the pages as well as paragraphs of the source document. One or more machine learning models that have been trained to make comparisons may be used by components 264, 266 to perform the comparisons in some approaches.

For instance, training data for the machine learning models may be received from one or more repositories that are available over a network (e.g., the Internet). The machine learning models may also be trained using historical data acquired during use. The machine learning models are thereby able to determine combinations of fonts, colors, sizes, etc. that can be used to implement note fragments. For instance, the most common combination(s) of text and/or comment text in a source document may be identified by the machine learning models, and used to design how note fragments are integrated with the source document. Additionally, performance information received in real-time may be used to further modify how the note fragments are integrated with the source document.

Components 264, 266 may send results of the comparisons to a conflict management module 268. The conflict management module 268 is preferably able to evaluate each of the note fragments, identify conflicting note fragments, and merge them together to form a combined set of deduplicated note fragments, e.g., as described in further detail below (e.g., see method 300 of FIG. 3A). In some approaches, the conflict management module 268 may rearrange note fragments in the source document depending on how closely each note fragment corresponds to the source document. For instance, more relevant and/or important note fragments may be moved higher on a page, while less relevant and/or important note fragments are moved lower on the page.

Referring still to FIG. 2B, the generation phase 272 of the process flow 250 preferably receives a combined set of note fragments from the conflict management module 268. As noted above, redundant, incorrect, unintentional, etc. note fragments may be removed to form a combined set of deduplicated note fragments. Configuration module 274 may evaluate each of the note fragments in a combined set received from the conflict management module 268, and determine how to integrate the note fragments with information in the source document. In other words, configuration module 274 may be used to determine where and how a note fragment will be implemented in the source document.

Configuration module 274 is coupled to a generating module 276. The generating module 276 may use information received from the configuration module 274 to create a combined pseudo-source document 278 which includes at least a portion of an original (e.g., source) document and a combined set of note fragments. Additionally, predetermined settings 280 may be used to update details (e.g., characteristics) of the pseudo-source document 278. For example, at least some of the participants of a group meeting may be correlated with a predetermined font, color, style, unique identification, etc. Note fragments corresponding to a given user may thereby be updated in the pseudo-source document 278 to reflect a predetermined font, color, style, unique identification, etc. The dashed line thereby represents updating (e.g., modifying) details of a given note in the pseudo-source document 278 to match predetermined settings in response to determining predetermined settings exist for the participant that originally created the given note.

It should be noted that while implementations herein are described in the context of information that is being created by different participants, this is in no way intended to be limiting. For instance, while a "participant" (also referred to herein as a "user") is described in approaches herein as an individual, the participant may actually be an application, an organization, etc. The use of "notes," "information," and "document" herein is in no way intended to be limiting either, and may include any desired type of details, e.g., such as physical data storage locations, changes suggested by participants, logical data storage locations, logical to physical tables, data write details, etc.

Referring back now to FIG. 2A, the electronic devices 204, 206, 208 are shown as having a different configuration than the central server 202. For example, in some implementations the central server 202 includes a large (e.g., robust) processor 212 coupled to a cache 211, a machine learning module 213, and a data storage array 214 having a relatively high storage capacity. The central server 202 is thereby able to process and store a relatively large amount of data, notes, and other information received from the electronic devices 204, 206, 208. This allows the central server 202 to connect to the various participants 205, 207, 209, and receive copies of notes pertaining to a shared electronic document which may be stored in data storage array 214.

The notes from various participants may further be compared against each other and merged together to form a combined set of notes which may be used to modify the shared electronic document. For example, redundant notes, conflicting notes, unsupported notes, etc. may be deduplicated, thereby resulting in a streamlined list of notes to add to the shared electronic document. Using the combined set of notes to modify the shared electronic document also reduces implementation time by accumulating each of the deduplicated notes before being implemented in the shared document. Again, this may be achieved at least in part by training and implementing machine learning models that are configured to evaluate notes from different participants and merge the notes into a combined set, e.g., as described in further detail below in method 300.

The central server 202 may also store at least some information about the different electronic devices 204, 206, 208 and/or participants 205, 207, 209. For instance, one or more predetermined settings, participant preferences, application preferences, performance metrics, etc., may be collected from the electronic devices 204, 206, 208 and/or participants 205, 207, 209 over time and stored in memory for future use. Additionally, at least some of the information that is collected from the participants may be hashed and randomized before being stored in memory in some approaches. For instance, some approaches include encrypting and storing preferential selections, geographical location information, passwords, etc.

This information can later be used to customize at least certain details of a note or other type of supplemental information that is used to modify a shared electronic document. For example, a machine learning model may be trained using details of notes inserted in the past and the participants that created the notes. The machine learning model may thereby be used to merge notes received for a shared document based at least in part on patterns identified by the machine learning model in the training data.

Looking now to the electronic devices 204, 206, 208, each are shown as including a processor 216 coupled to memory 218, 220. The memory implemented at each of the electronic devices 204, 206, 208 may be used to store data received from one or more sensors (not shown) in communication with the respective electronic devices, the participants 205, 207, 209 themselves, the central server 202, different systems also connected to network 210, etc. It follows that different types of memory may be used. According to an example, which is in no way intended to limit the invention, electronic devices 204 and 208 may include hard disk drives as memory 218 while electronic device 206 includes a solid state memory module as memory 220.

The processor 216 is also connected to a display screen 224, a keyboard 226, a computer mouse 228, a microphone 230, and a camera 232. The processor 216 may thereby be configured to receive inputs from the keyboard 226 and computer mouse 228 as entered by the participants 205, 207, 209. These inputs typically correspond to information presented on the display screen 224 while the entries were received. Moreover, the inputs received from the keyboard 226 and computer mouse 228 may impact the information shown on display screen 224, data stored in memory 218, 220, information collected from the microphone 230 and/or camera 232, status of an operating system being implemented by processor 216, etc. Each of the electronic devices 204, 206, 208 are also shown as including a speaker 234 which may be used to project (e.g., generate) one or more audio signals.

It should also be noted that the display screen 224, the keyboard 226, the computer mouse 228, microphone 230, camera 232, and speaker 234 are each coupled directly to the processor 216 in the present implementation. Accordingly, inputs received from the keyboard 226 and/or computer mouse 228 may be evaluated before being implemented in the operating system and/or shown on display screen 224.

It should also be noted that while the electronic devices 204, 206, 208 are depicted as including similar components and/or design, each of these electronic devices 204, 206, 208 may include any desired components which may be implemented in any desired configuration. In some instances, each electronic device (e.g., mobile phone, laptop computer, desktop computer, etc.) connected to a network may be configured differently to provide each location with a different functionality.

According to an example, which is in no way intended to limit the invention, electronic device 204 may include a cryptographic module (not shown) that allows participant 205 to produce encrypted data, while electronic device 206 includes a data compression module (not shown) that allows data to be compressed before being sent over the network 210 and/or stored in memory, thereby improving performance of the system by reducing network strain and/or compute overhead at the electronic device itself. In another example, which again is in no way intended to limit the invention, electronic device 208 may include a machine learning module (not shown) configured to train and/or implement one or more machine learning models.

It follows that the different electronic devices in system 200 may have different performance capabilities. As noted above, the central server 202 may have a higher storage capacity compared to the electronic devices 204, 206, 208. While this may allow the central server 202 to store more data than the electronic devices 204, 206, 208, other factors impact performance. For example, traffic over network 210 may limit the amount of data that may be sent to the central server 202 from the electronic devices 204, 206, 208. The workload experienced at each of the electronic devices 204, 206, 208 also impacts latency and limits the achievable performance at the respective locations and the system as a whole.

These varying performance characteristics have also had a material impact on the efficiency by which conventional systems are able to update a shared electronic document, particularly in view of the communication restrictions that conventional products have been forced to deal with. Again, implementations herein are even able to automatically merge supplemental information with the content of a source document. This is achieved by performing note fragment interception on information received from different participants.

In some approaches, a software program may provide a user the option to simply select a source document and the supplemental information (e.g., notes) to be implemented in the source document. Moreover, trained machine learning models may be used to evaluate the note fragments and merge them to create a combined pseudo-source document. Implementations may thereby be able to dynamically update settings of shared documents while maintaining a high level of efficiency.

Figure 3A:
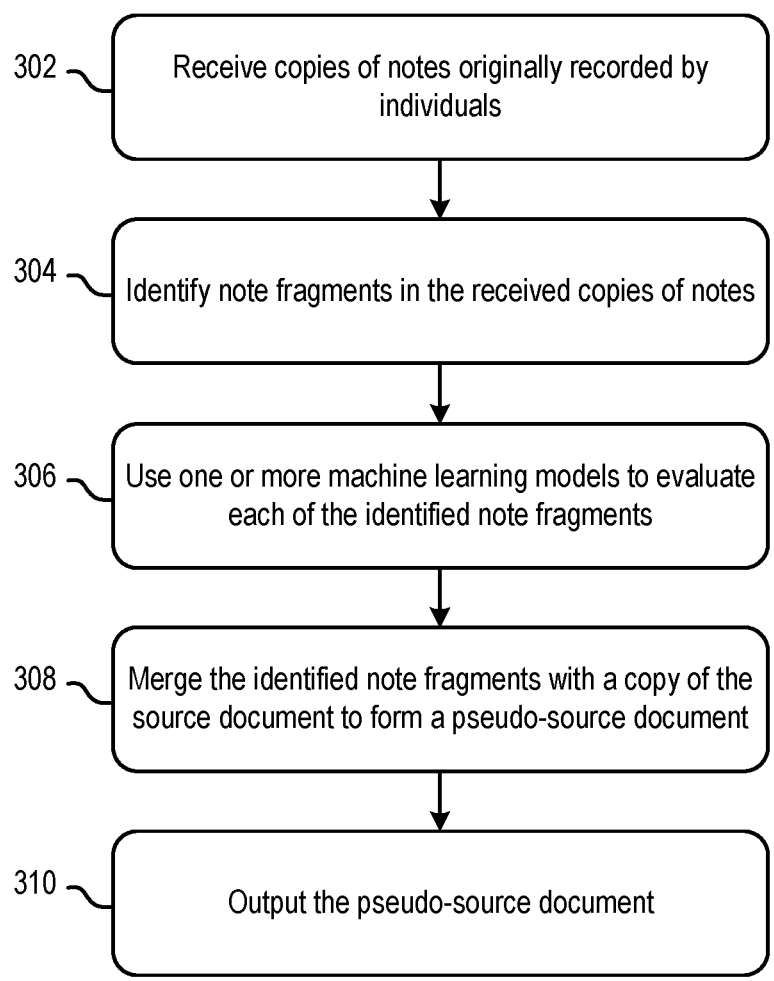
FIG. 3A is a flowchart of a method, in accordance with one approach.

Looking now to FIG. 3A, a flowchart of a computer-implemented method 300 for merging notes and other information with the content of a shared source document is illustrated, in accordance with one approach. In other words, method 300 involves using trained machine learning models to evaluate notes and other fragments, before merging them together to create a combined pseudo-source document. Method 300 may be performed in accordance with the present invention in any of the environments depicted in FIGS. 1-2, among others, in various approaches. Of course, more or less operations than those specifically described in FIG. 3A may be included in method 300, as would be understood by one of skill in the art upon reading the present descriptions.

Each of the steps of the method 300 may be performed by any suitable component of the operating environment using known techniques and/or techniques that would become readily apparent to one skilled in the art upon reading the present disclosure. For example, one or more processors located at a central server of a distributed system (e.g., see central server 202 of FIG. 2A above) may be used to perform one or more of the operations in method 300.

Moreover, in various approaches, the method 300 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

Looking to FIG. 3A, operation 302 includes receiving copies of notes originally recorded by individuals. As noted above, the term "notes" is in no way intended to be limiting and may include any desired type of information entered by the individuals. For example, suggested edits, directed analysis, predicted outcomes, etc., may be represented in the notes that are received from an individual.

The individuals who originally recorded the notes may be participants of a group setting, e.g., such as a teleconference, a group video chat, an in-person meeting, etc. Moreover, a portion of the group experience may be spent reviewing a shared document. For example, a group of individuals may participate in a video call, during which a visual presentation is reviewed (e.g., evaluated). In this example, the copies of notes received in operation 302 may correspond to notes that each participant of the video call takes to summarize their input for the presentation. While the presentation is being given, each of the individuals may record their notes using different mediums, e.g., depending on personal preference. For instance, one participant may record their notes using a pen and physical paper, while another participant summarizes notes using an erase marker and whiteboard for a small group of participants attending the video call together while in a same physical room. Still other participants may record their notes by using a computer to modify a copy of the presentation itself.

It follows that participants of a group setting may record notes and other types of information in a number of different ways. As alluded to above, the notes may be originally recorded by a participant using physical paper, whiteboards, chalkboards, computer memory (e.g., using computer programs or software), etc. Conventionally, it has been significantly difficult to integrate or even evaluate information that is recorded on different types of mediums. In contrast, method 300 is able to harmonize the various notes such that they may be efficiently integrated into a shared document without experiencing time delay or information loss.

For instance, information included in some recorded notes may be captured using photographs. In other words, digital pictures of the notes may be taken and uploaded such that they may be processed. According to an example, a picture of the notes written on a whiteboard may be taken and uploaded for processing. In some approaches, image processing (e.g., optical character recognition) may be performed on the images to extract a textual representation of the information included in the notes. While image processing may be performed at a central location in response to receiving photos from participant locations, other implementations involve performing image processing at participants' locations before sending the image processing results to a central location (e.g., see central server 202 of FIG. 2A). Performing image processing prior to sending the images to the central location significantly reduces network traffic. It also allows each of the participant locations to process information (e.g., copies of notes) in parallel before sending results to a central location for implementation. This further improves throughput of the system, e.g., as would be appreciated by one skilled in the art after reading the present description.

From operation 302, method 300 proceeds to operation 304. There, operation 304 includes identifying note fragments in the received copies of notes. With respect to the present description, a "note fragment" represents one of the notes in a received copy of a shared document. A note fragment may thereby correspond to a specific portion of the shared document.

Each note fragment may be referenced using an address sequence, as well as start and end attributes of the address sequence. In other words, the extents of a note may be described using a location and relative size of the note. In some approaches, the process of identifying note fragments in received copies of notes involves using a fragment interception function block. The fragment interception function block may identify and extract information that describes the portions of a source document that each of the notes correspond to. For instance, the fragment interception function block may extract and store the address sequence of note fragments, calculate a correlation degree, as well as set the start and end attribute of the address. Function blocks may include document identification, segment interception, page component, paragraph component, location point conflict management, layout analysis, generator, and related resources, e.g., such as a participant profile.

According to an example, the location of a note in an electronic word document may be identified using page and line numbers, while a size of the note may be indicated by the number of characters therein. Moreover, an electronic word document may be a modified version of the source document in some situations. In these situations, the notes (e.g., modifications) made may be identified by comparing the modified version of the source document to the original version of the source document and identifying the differences therebetween, e.g., as would be appreciated by one skilled in the art after reading the present description.

Proceeding now to operation 306, there method 300 includes using one or more machine learning models to evaluate each of the identified note fragments. As noted above, note fragments may be evaluated by comparing each of the note fragments to pages and paragraphs in the source document that the respective note fragments are located in. The machine learning models are thereby able to determine how closely each of the note fragments match the broader content on a page the respective note fragments are found, as well as more direct content in a same paragraph as the note fragment.

In some approaches, the machine learning models may be configured to use exact and/or fuzzy matching to compare each of the identified note fragments to a corresponding one or more of the pages in the source document. In other words, each note fragment is compared against the page(s) in which it is found, using exact and/or fuzzy matching. However, other types of word based processing (e.g., natural language processing) may be implemented by the machine learning models to compare content of a note fragment, to the content found on a same page, chapter, paragraph, sentence, etc., depending on the desired implementation. For instance, component matching may be used in some approaches to compare each of the identified note fragments to a corresponding one or more of the paragraphs in the source document. In other words, each note fragment is compared against the paragraph(s) in which it was found, using component matching.

It follows that in addition to location and size, additional details of the notes may be determined. For instance, a degree of similarity (e.g., correlation degree) may be determined for each of the note fragments, which represents how similar each note fragment is to the source document.

According to an example, the degree of similarity between a note fragment and the source document in which the note fragment is located, includes extracting information from the note fragment as well as the page and paragraph of the source document. For instance, document page number keywords (DP), document paragraph keywords (DS), note paragraph index (NSI), note sentence index (NCI), the sentence content word vector (NV) may be collected from a source document. Moreover, the relevance "R" of each note fragment can be calculated as: $R=f(V1, V2)$, where $V1=$ [DP1, DS1, NSI1, NCI1, NV1] and $V2=$[DP2, DS2, NSI2, NCI2, NV2]. Moreover, the threshold "t" may be set such that if $R12>t$, then combine two notes into a single fragment.

According to an in-use example, the relevance of note fragments may be determined based on where the respective fragments are located in a paragraph and/or page of a source document. For instance, note fragments located closer to a center of a paragraph may be assigned a higher relevance value for the given paragraph. However, note fragments located farther from a center of a paragraph may be assigned a lower relevance value for the given paragraph. Similarly, note fragments located closer to a center of a page may be assigned a higher relevance value, while note fragments located closer to the beginning or end of a page may be assigned a lower relevance value for the page. In still other approaches, note fragments may be assigned a higher relevance value if they have a certain number of words in common with the page and/or paragraph. In other approaches, note fragments may be assigned higher or lower relevance values depending on whether each of the fragments include one or more predetermined words.

In some approaches, a fragment interception function block (e.g., see 260 in FIG. 2B above) may be used to calculate a degree of similarity for each identified note fragment. This degree of similarity may be calculated as a result of comparing each of the note fragments to different aspects of the source document to determine the degree of similarity therebetween. For instance, the note fragments may be evaluated and compared against various details of a source document using one or more machine learning models.

From operation 306, method 300 proceeds to operation 308. There, operation 308 includes merging the identified note fragments with a copy of the source document to form a pseudo-source document. As noted above, the process of integrating changes (e.g., notes) with a source document includes creating a copy of the source document and making at least some of the changes thereto. For instance, by comparing changes to the content of the source document, incorrect, irrelevant, incomplete, conflicting, etc. ones of the changes may be identified. Changes may also be compared against each other to determine conflicting entries for deduplication.

Figure 3B:
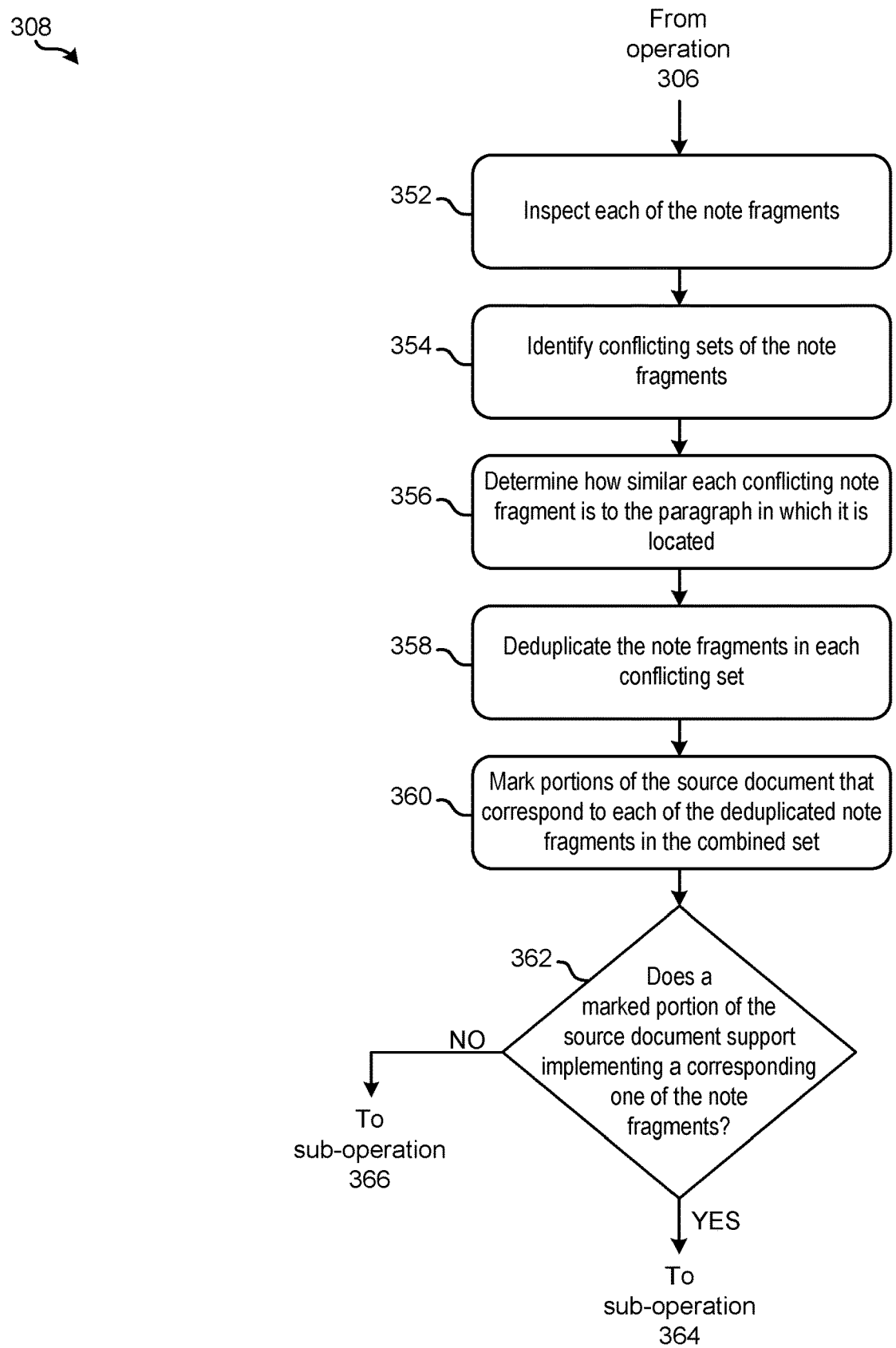
FIG. 3B is a flowchart of sub-processes for one of the operations in the method of FIG. 3A, in accordance with one approach.
Figure 3B:
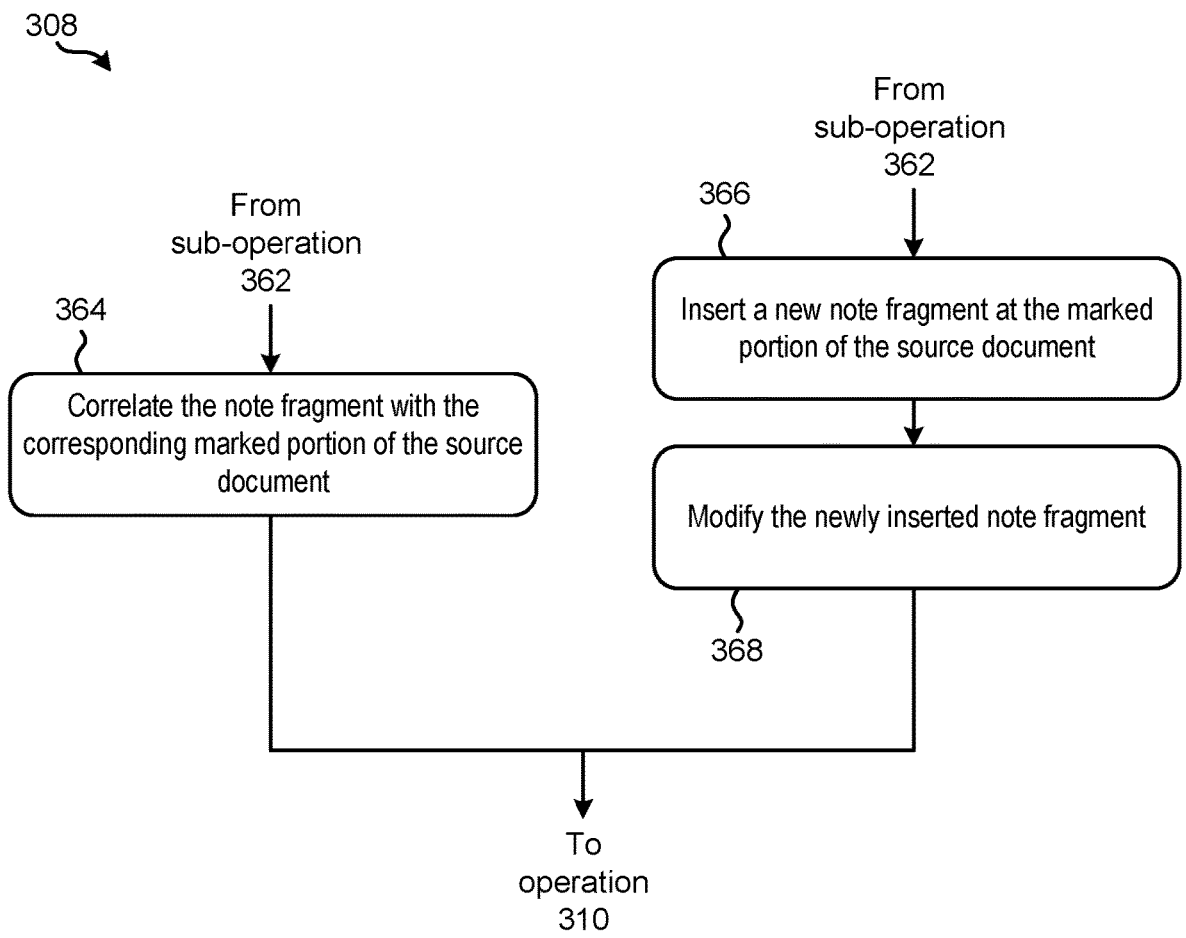

Referring momentarily now to FIG. 3B, exemplary sub-operations of merging note fragments with a copy of a source document to form a pseudo-source document are illustrated in accordance with one embodiment. It follows that one or more of the sub-operations may be used to perform operation 308 of FIG. 3A. However, it should be noted that the sub-processes of FIG. 3B are illustrated in accordance with one embodiment which is in no way intended to limit the invention.

As shown, sub-operation 352 of FIG. 3B includes inspecting each of the note fragments, while sub-operation 354 includes identifying conflicting sets of the note fragments. In some approaches, conflicting note fragments may involve making different changes to a same portion of a source document. In other approaches, conflicting note fragments may contradict predetermined settings associated with the source document. It follows that each note fragment may be inspected and compared to the other note fragments differently. Moreover, sets of conflicting note fragments may be marked (e.g., flagged), stored in a predetermined memory location, added to a lookup table, etc., to increase ease of access.

Sub-operation 356 further includes determining how similar each conflicting note fragment is to the paragraph in which it is located. In other words, sub-operation 356 includes determining a degree of similarity between each note fragment in a given conflicting set, and the respective paragraph of the source document in which the note fragment is located. Accordingly, sub-operation 358 includes deduplicating the note fragments in each conflicting set. The deduplication is preferably based at least in part on the similarities determined in sub-operation 356. However, additional information may be evaluated to perform the deduplication. For instance, in some approaches conflicting note fragments may be deduplicated by evaluating smooth text of the note fragments (e.g., the characters of the note fragments which may be supplemented with additional content to fill any gaps in the fragments), grammatical structure in the note fragments, etc.

Proceeding now to sub-operation 360, portions of the source document that correspond to each of the deduplicated note fragments in the combined set are marked. The portions of the source document may be marked using one or more flags, formatting changes (e.g., highlighting in a word processing document), headnotes and/or footnotes, metadata stored in a header, etc. Moreover, sub-operation 362 includes determining whether each marked portion of the source document supports implementing a corresponding one of the note fragments. In other words, sub-operation 362 includes determining whether the source document is able to support implementing each of the note fragments, e.g., depending on a type of information included in the note fragments, a format of the source document, user preferences, predetermined settings, etc.

The flowchart proceeds to sub-operation 364 from sub-operation 362 in response to determining that the source document supports implementing a corresponding one of the note fragments. There, sub-operation 364 includes correlating the given note fragment with the corresponding marked portion of the source document. Again, because it is determined that a note fragment is supported in the source document, the note fragment may be seamlessly implemented in (e.g., added to) the source document. In some approaches, a supported note fragment may be processed by a software program that created the source document and/or a copy thereof, e.g., as would be appreciated by one skilled in the art after reading the present description.

Returning to sub-operation 362, the flowchart is shown as proceeding to sub-operation 366 in response to determining that the source document does not support implementing a corresponding one of the note fragments. There, sub-operation 366 includes inserting a new note fragment at the marked portion of the source document. In other words, sub-operation 366 includes integrating a note fragment in a source document that may be configured in a different format, defined using a different programming language, etc. It follows that in some approaches, sub-operation 366 includes converting a note fragment into a different format such that it may be implemented at a desired location in the source document.

From sub-operation 366, the flowchart advances to sub-operation 368. There, sub-operation 368 further includes modifying the newly inserted note fragment. As noted above, predetermined settings may be used to update details (e.g., characteristics) of the newly inserted note fragment. For example, at least some of the participants in a group meeting may be correlated with a predetermined font, color, style, unique identification, etc. Newly created note fragments that correspond to a given user may thereby be modified (e.g., updated) to reflect a predetermined font, color, style, unique identification, etc. Thus, sub-operation 368 may include using a profile corresponding to a participant that originally recorded the given note fragment, to modify details of the new note fragment. Participant profiles may be predetermined by the participants, generated using machine learning models evaluating past note taking, etc., depending on the approach.

From sub-operation 368, the flowchart returns to operation 310 of method 300. Accordingly, looking again to FIG. 3A, method 300 proceeds to operation 310 in response to merging the note fragments to form a pseudo-source document. There, operation 310 includes outputting the pseudo-source document. In some approaches, the source document may be replaced with the pseudo-source document as a current (e.g., latest) draft of the document. In other words, outputting the pseudo-source document may simply involve designating the pseudo-source document as the current draft of the document. However, in other approaches the pseudo-source document may be stored in a predetermined memory location, displayed, sent to a remote location, evaluated further, etc. In still other approaches, operation 310 may involve returning the pseudo-source document to each participant from which the original copies of notes were received. Each participant is thereby given access to all notes generated by the other participants.

It follows that method 300 is able to automatically evaluate and merge supplemental information with the content of a source document. This is achieved by performing note fragment interception on information received from different participants. Moreover, trained machine learning models may be used to evaluate the note fragments and merge them to create a combined pseudo-source document. Implementations herein are thereby able to improve the efficiency by which various inputs received from different individuals may be automatically combined and used to supplement a source document.

It should also be noted that implementations herein may be built on top of the existing working environments, thereby achieving improved performance without affecting the underlying settings. For example, existing working environments include: hardware, system, applications, presentation document, note record, comments record, and participant profile. It may also be desirable to implement merge tasks through an interface, e.g., including document recognition, fragment interception, page and paragraph components, layout analysis, generator, and training module. Implementations herein are thereby able to merge notes and comments simply and effectively in different locations with a source (e.g., main shared) document. This desirably simplifies the operation process of merging a source document with various notes and comments, thereby improving performance efficiency.

Figure 4:
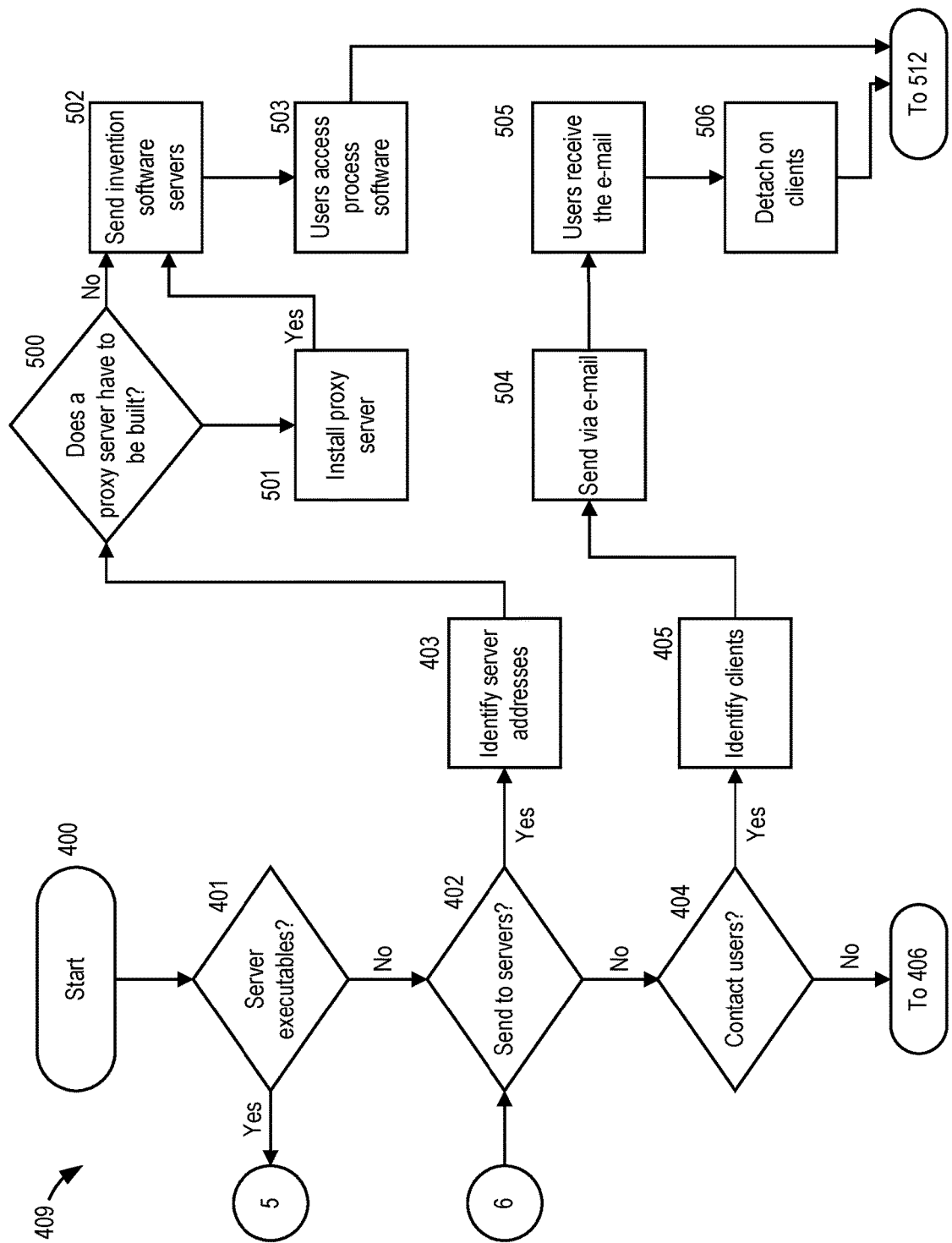
FIG. 4 is a flowchart of a method, in accordance with one approach.
Figure 4:
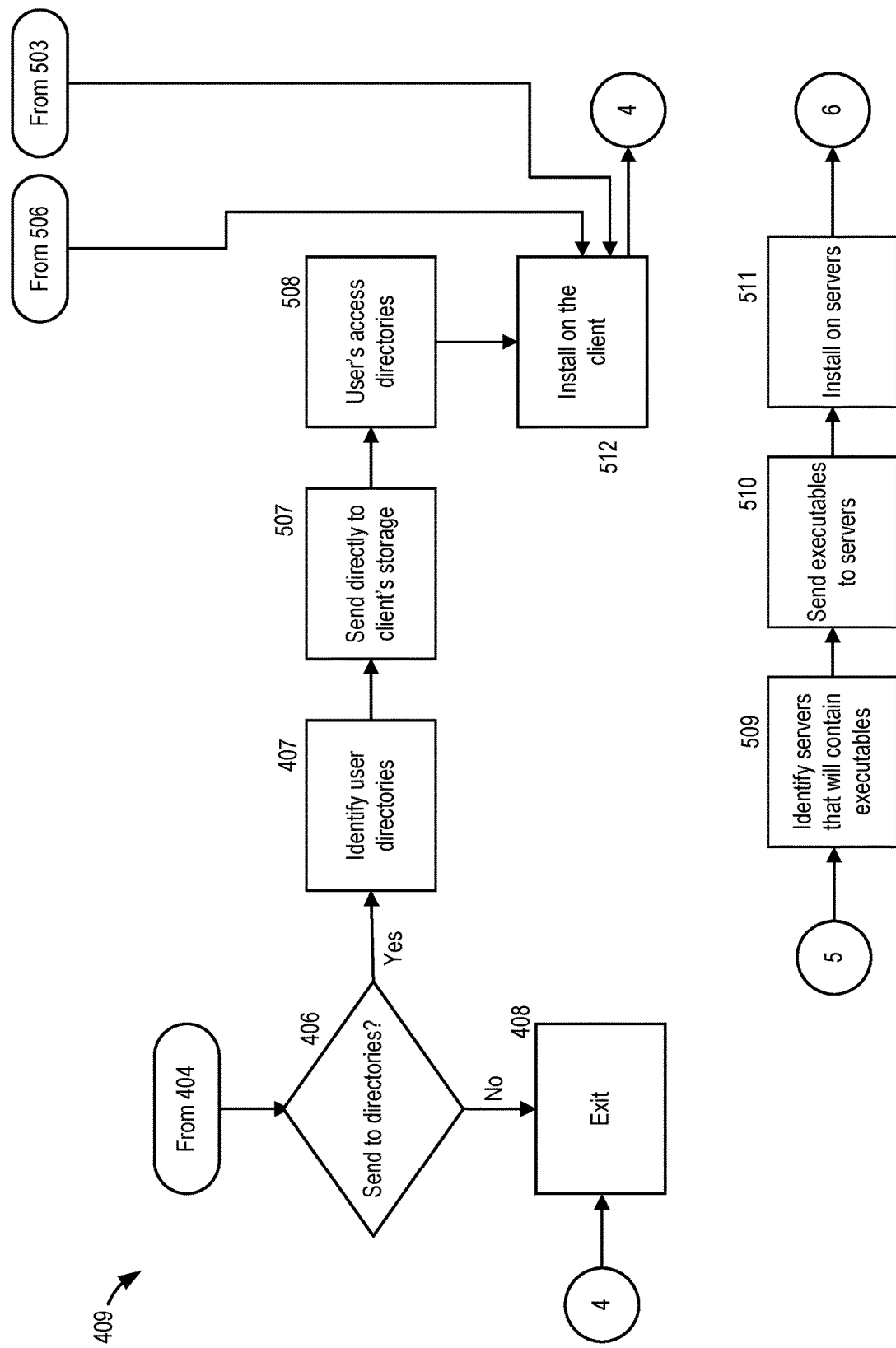

Now referring to FIG. 4, a flowchart of a method 409 is shown according to one approach. The method 409 may be performed in accordance with the present invention in any of the environments depicted in FIGS. 1-3B, among others, in various approaches. Of course, more or fewer operations than those specifically described in FIG. 4 may be included in method 409, as would be understood by one of skill in the art upon reading the present descriptions.

Each of the steps of the method 409 may be performed by any suitable component of the operating environment. For example, in various approaches, the method 409 may be partially or entirely performed by a processing circuit, e.g., such as an IaC access manager, or some other device having one or more processors therein. The processor, e.g., processing circuit(s), chip(s), and/or module(s) implemented in hardware and/or software, and preferably having at least one hardware component, may be utilized in any device to perform one or more steps of the method 409. Illustrative processors include, but are not limited to, a central processing unit (CPU), an application specific integrated circuit (ASIC), a field programmable gate array (FPGA), etc., combinations thereof, or any other suitable computing device known in the art.

While it is understood that the process software associated with automatically evaluating and merging supplemental information with the content of a source document may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

With continued reference to method 409, step 400 begins the deployment of the process software. An initial step is to determine if there are any programs that will reside on a server or servers when the process software is executed (401). If this is the case, then the servers that will contain the executables are identified (509). The process software for the server or servers is transferred directly to the servers' storage via FTP or some other protocol or by copying though the use of a shared file system (510). The process software is then installed on the servers (511).

Next, a determination is made on whether the process software is to be deployed by having users access the process software on a server or servers (402). If the users are to access the process software on servers, then the server addresses that will store the process software are identified (403).

A determination is made if a proxy server is to be built (500) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (501). The process software is sent to the (one or more) servers either via a protocol such as FTP, or it is copied directly from the source files to the server files via file sharing (502). Another approach involves sending a transaction to the (one or more) servers that contained the process software, and have the server process the transaction and then receive and copy the process software to the server's file system. Once the process software is stored at the servers, the users, via their client computers, then access the process software on the servers and copy to their client computers file systems (503). Another approach is to have the servers automatically copy the process software to each client and then run the installation program for the process software at each client computer. The user executes the program that installs the process software on the client computer (512) and then exits the process (408).

In step 404 a determination is made whether the process software is to be deployed by sending the process software to users via e-mail. The set of users where the process software will be deployed are identified together with the addresses of the user client computers (405). The process software is sent via e-mail (504) to each of the users' client computers. The users then receive the e-mail (505) and then detach the process software from the e-mail to a directory on their client computers (506). The user executes the program that installs the process software on the client computer (512) and then exits the process (408).

Lastly, a determination is made on whether the process software will be sent directly to user directories on their client computers (406). If so, the user directories are identified (407). The process software is transferred directly to the user's client computer directory (507). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (508). The user executes the program that installs the process software on the client computer (512) and then exits the process (408).

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving copies of notes that were originally recorded by participants, the notes corresponding to a source document;
identifying note fragments in the received copies of notes;
using one or more machine learning models to compare the identified note fragments to pages and paragraphs in the source document that the respective note fragments are located in;
merging, based at least in part on the comparison, the identified note fragments with a copy of the source document to form a pseudo-source document; and
outputting the pseudo-source document,
wherein merging the identified note fragments with the copy of the source document to form a pseudo-source document, includes:
identifying conflicting sets of note fragments; and
for each of the conflicting sets:
determining a degree of similarity between each note fragment in a given conflicting set and the respective paragraph of the source document in which the note fragment is located, and
deduplicating the note fragments in the given conflicting set based at least in part on the determined degrees of similarity.

2. The computer-implemented method of claim 1, wherein using the machine learning models to compare the identified note fragments to pages and paragraphs in the source document, includes:
using exact and/or fuzzy matching to compare the identified note fragments to a corresponding one or more of the pages in the source document; and
using component matching to compare the identified note fragments to a corresponding one or more of the paragraphs in the source document.

3. The computer-implemented method of claim 1, wherein merging the identified note fragments with the copy of the source document to form a pseudo-source document, includes for the respective identified note fragments:
marking a portion of the source document that corresponds to a given one of the identified note fragments;
determining whether the marked portion of the source document supports implementing the given note fragment; and
in response to determining the marked portion of the source document supports implementing the given note fragment, correlating the given note fragment with the marked portion of the source document.

4. The computer-implemented method of claim 3, comprising:
in response to determining the marked portion of the source document does not support implementing the given note fragment, inserting a new note fragment at the marked portion of the source document; and
using a profile corresponding to a participant that originally recorded the given note fragment, to modify details of the new note fragment.

5. The computer-implemented method of claim 1, wherein outputting the pseudo-source document includes:
replacing the source document with the pseudo-source document as a current draft of the document.

6. The computer-implemented method of claim 1, wherein identifying note fragments in the received copies of notes includes extracting (i) an address sequence of each note fragment, as well as (ii) start and end attributes of each address sequence.

7. The computer-implemented method of claim 1, wherein the notes were originally recorded by the participants on a medium selected from the group consisting of: paper, whiteboards, chalkboards, and computer memory, wherein receiving copies of notes includes receiving a photograph of notes recorded by a participant on a whiteboard.

8. The computer-implemented method of claim 7, wherein deduplicating the note fragments in the given conflicting set includes:
discarding redundant, conflicting, and/or unsupported note fragments from the respective conflicting sets.

9. The computer-implemented method of claim 1, wherein identifying note fragments in the received copies of notes includes:
extracting (i) address sequences of the respective note fragments, as well as (ii) start and end attributes of the respective address sequences; and
calculate correlation degrees for the respective address sequences,
wherein the notes were originally recorded by the participants on a physical medium selected from the group consisting of: paper, whiteboards, chalkboards, and computer memory.

10. A computer program product, comprising a computer readable storage medium having program instructions embodied therewith, the program instructions readable by a processor, executable by the processor, or readable and executable by the processor, to cause the processor to:
receive copies of notes that were originally recorded by participants, the notes corresponding to a source document, wherein the notes were originally recorded by the participants on a physical medium;
identify note fragments in the received copies of notes;
use one or more machine learning models to compare the identified note fragments to pages and paragraphs in the source document that the respective note fragments are located in;
merge, based at least in part on the comparison, the identified note fragments with a copy of the source document to form a pseudo-source document by:
identifying conflicting sets of note fragments; and for the respective conflicting sets:
    determining a degree of similarity between each note fragment in a given conflicting set and the respective paragraph of the source document in which the note fragment is located, and
    deduplicating the note fragments in the given conflicting set based at least in part on the determined degrees of similarity; and
output the pseudo-source document.

11. The computer program product of claim 10, wherein using the machine learning models to compare the identified note fragments to pages and paragraphs in the source document, includes:
    using exact and/or fuzzy matching to compare the identified note fragments to a corresponding one or more of the pages in the source document; and
    using component matching to compare the identified note fragments to a corresponding one or more of the paragraphs in the source document.

12. The computer program product of claim 10, wherein deduplicating the note fragments in the given conflicting set based at least in part on the determined degrees of similarity, includes:
    using the one or more machine learning models to identify redundant and/or unsupported ones of the note fragments in the given conflicting set based at least in part on the determined degrees of similarity; and
    causing the identified redundant and/or unsupported ones of the note fragments to be removed from the given conflicting set.

13. The computer program product of claim 10, wherein merging the identified note fragments with the copy of the source document to form a pseudo-source document, includes for the identified note fragments:
    marking a portion of the source document that corresponds to a given one of the identified note fragments;
    determining whether the marked portion of the source document supports implementing the given note fragment; and
    in response to determining the marked portion of the source document supports implementing the given note fragment, correlating the given note fragment with the marked portion of the source document.

14. The computer program product of claim 13, wherein the program instructions are readable and/or executable by the processor to cause the processor to:
    in response to determining the marked portion of the source document does not support implementing the given note fragment, insert a new note fragment at the marked portion of the source document; and
    use a profile corresponding to a participant that originally recorded the given note fragment, to modify details of the new note fragment.

15. The computer program product of claim 10, wherein outputting the pseudo-source document includes:
    replacing the source document with the pseudo-source document as a current draft of the document.

16. The computer program product of claim 10, wherein identifying note fragments in the received copies of notes includes extracting (i) an address sequence of each note fragment, as well as (ii) start and end attributes of each address sequence.

17. The computer program product of claim 10, wherein the physical medium is selected from the group consisting of: paper, whiteboards, chalkboards, and computer memory, wherein receiving copies of notes includes receiving a photograph of notes recorded by a participant on a whiteboard.

18. A system, comprising:
a processor; and
logic integrated with the processor, executable by the processor, or integrated with and executable by the processor, the logic being configured to:
    receive a copy of notes that were originally recorded by participants on a physical medium, the notes corresponding to a source document;
    identify note fragments in the received copies of notes;
    use one or more machine learning models to compare the identified note fragments to pages and paragraphs in the source document that the respective note fragments are located in;
    form a pseudo-source document by merging, based at least in part on the comparison, the identified note fragments with a copy of the source document to,
    wherein merging the identified note fragments with a copy of the source document includes:
        identifying conflicting sets of note fragments; and
        for the respective conflicting sets:
            determining a degree of similarity between each note fragment in a given conflicting set and the respective paragraph of the source document in which the note fragment is located, and
            deduplicating the note fragments in the given conflicting set based at least in part on the determined degrees of similarity; and
    output the pseudo-source document.

19. The system of claim 18, wherein using the machine learning models to compare the identified note fragments to pages and paragraphs in the source document, includes:
    using exact and/or fuzzy matching to compare the identified note fragments to a corresponding one or more of the pages in the source document; and
    using component matching to compare the identified note fragments to a corresponding one or more of the paragraphs in the source document.

20. The system of claim 18, wherein the notes were originally recorded by the participants on a medium selected from the group consisting of: paper, whiteboards, chalkboards, and computer memory, wherein receiving copies of notes includes receiving a photograph of notes recorded by a participant on a whiteboard.

* * * * *